Oct. 3, 1933.  L. D. KAY  1,928,896
AUTOMOBILE WHEEL
Filed Dec. 1, 1928
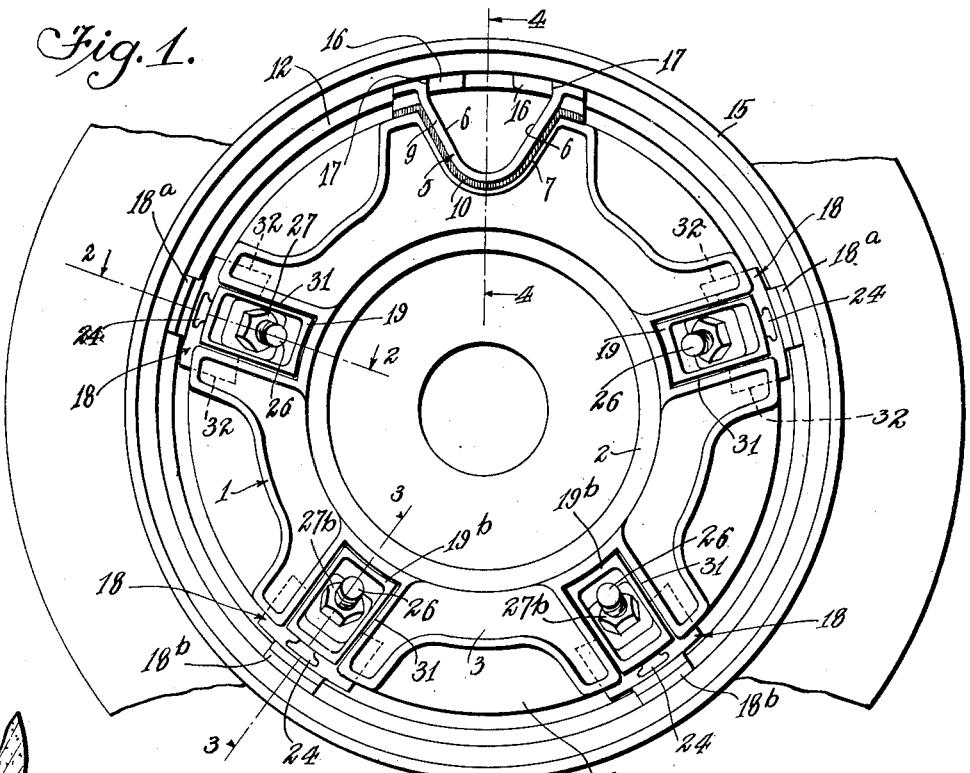
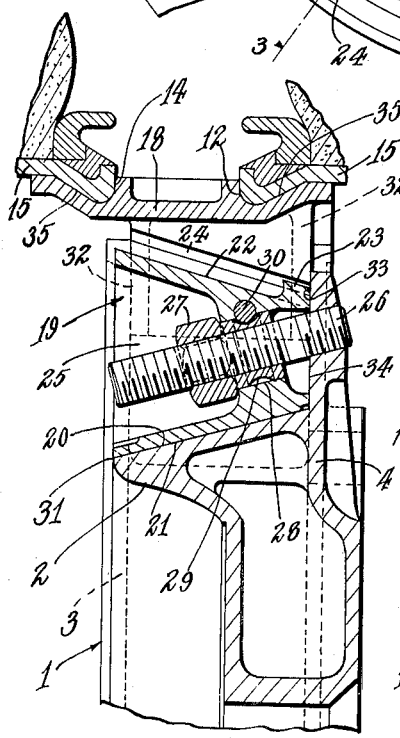
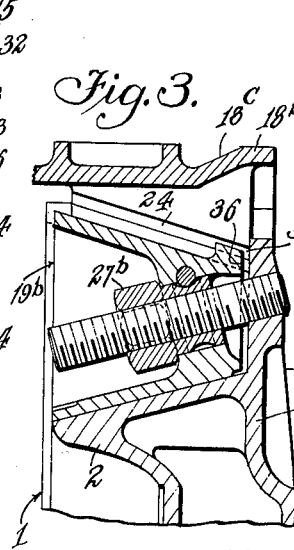
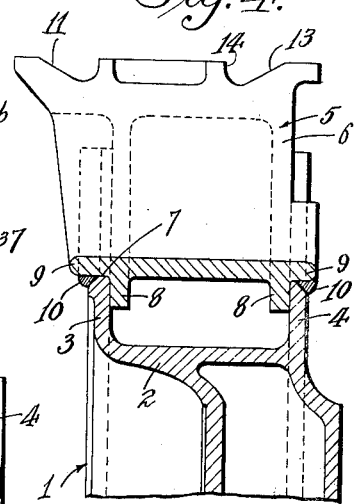
Inventor
Lloyd D. Kay
By Lyon & Lyon
Attorneys Patented Oct. 3, 1933

1,928,896

UNITED STATES PATENT OFFICE 1,928,896

AUTOMOBILE WHEEL

Lloyd D. Kay, Los Angeles, Calif., assignor, by mesne assignments, to Kay Brunner Steel Products, Inc., a corporation Application December 1, 1928. Serial No. 323,158

5 Claims. (Cl. 301—12)

This invention relates to automobile wheels and while the invention may be applied to any type of automobile wheel, it is intended to be especially useful as applied to dual tired automobile wheels of the type illustrated in my prior Patent No. 1,828,500, granted to me on October 20, 1931, carried on heavy trucks. It is the common practice to employ studs and lugs clamped up by clamp-nuts to hold the rims of such wheels on the wheel. The use of loose nuts and lugs is objectionable because the nuts and the lugs are apt to become lost in changing a wheel rim on the road. The general object of this invention is to provide a wheel of simple construction in which the parts which are employed for securing and tightening up the rim on the wheel, are never disconnected from the wheel. In other words, one of the objects of the invention is to provide a construction which will operate so that when the clamping parts are loosened up, the wheel-rim can be readily removed without actually removing any of the parts from the wheel except the rim carrying the tire.

A further object of the invention is to provide a simple construction which will insure proper centering of the wheel-rim on the wheel, that is to say, to insure that the center of the rim when on the wheel, will coincide with the center of the wheel; another object is to provide ample means for supporting the radial inward thrust of the rim against the wheel body.

A further object of the invention is to provide improved means for effecting a solid connection from the driving lugs of the rim to the wheel body.

Another object of the invention is to provide a wheel construction which will enable the wheel to be readily adapted to support wheel-rims of different diameters.

Further objects of the invention will appear hereinafter.

The invention consists in the novel parts and combination of parts to be described hereinafter, all of which contribute to produce an efficient automobile wheel.

A preferred embodiment of the invention is described in the following specification, while the broad scope of the invention is pointed out in the appended claims.

In the drawing:

Figure 1 is a side elevation of a truck wheel embodying my invention, the tires of the wheel being shown broken away.

Figure 2 is a section taken about on the line 2—2 of Figure 1 but upon a slightly enlarged scale; this view shows portions of the tires and tire-rim broken away.

Figure 3 is a section taken on the line 3—3 of Figure 1 upon the same scale as Figure 2, but omitting the tire-rims and showing a portion of the rim-seat broken away.

Figure 4 is a section taken on the line 4—4 of Figure 1, but upon an enlarged scale.

Before proceeding to a description of this embodiment of the invention, it will facilitate the disclosure of the invention to state that according to my invention, I provide a plurality of rim-seats spaced around the periphery of the wheel, and between the rim-seats and the hub of the wheel I provide movable members preferably in the form of wedge blocks which, when tightened up by suitable means, force the rim-seats outwardly against the wheel-rim. The means for tightening up the wedge blocks is preferably constructed so that no parts need to be disconnected to loosen up the rim-seats from the rim. It is simply necessary to loosen up the wedge blocks to give them a slight movement in the direction which will loosen the rim-seats.

Another feature of the invention consists in the fact that I provide a fixed rim-seat at one point on the periphery of the wheel. This rim-seat is turned true to the inner diameter of the rim that is to be secured on the wheel. After the rim is in place, the movable rim-seats are then moved outwardly to engage the inner face of the rim and secure it in place. In doing this, I prefer to construct the wheel so that the movable rim-seats that are disposed adjacent to the fixed rim-seat are limited in their outward movement at a point where their seat faces are in circumferential alignment with the seat face of the fixed seat. With this arrangement it will be evident that these two movable rim-seats can be adjusted radially out as far as possible and left in that position. In this way three rim-seats are maintained on the wheel in proper position to center the wheel-rim. In applying the rim with the tire, it is hung over the wheel on these three permanent seats and then the intermediate rim-seats are moved radially outwardly to engage the rim. As it is only necessary to provide two of these intermediate rim-seats, it will be evident that a tire-rim can be very readily removed, as this operation merely involves the loosening up of two rim-seats.

The advantage of having all the rim-seats except one movable, however, is that if it is desired to adapt the wheel to receive a rim of larger diameter, this can readily be accomplished by providing a fixed rim-seat adapted to the larger diameter and then adjusting out radially the movable rim-seats to correspond with this diameter.

In the embodiment of the invention illustrated, 1 represents the wheel body. This wheel has a hub portion 2 from which two integral flanges 3 and 4 extend radially outwardly so that the typical cross-section of the wheel is U-shaped. (See Fig. 4). At any point on the periphery of the wheel, I provide a fixed rim-seat 5. This rim-seat may be of any suitable construction but is preferably in the form of a V-shaped saddle having diverging side walls 6 that are received in V-shaped sockets or notches 7 formed in the flanges 3 and 4. As indicated in Figure 4, the outer sides of the walls 6 are formed with ribs 8 that seat against the inner faces of the flanges 3 and 4, and the walls 6 and 7 are formed with lips 9 at their ends which project beyond the faces of the flanges 3 and 4 so as to facilitate a welding operation, the welding metal 10 being laid along the edges of the notches 7 and adjacent to the lips 9. The radially outer portion of the fixed seat 5 is formed with seat faces 11 of proper form to receive the bead or flange 12 formed on the edge of a standard tire-rim. In other words, these seat faces 11 have inclined portions 13 and abrupt shoulders 14 arranged as shown in Figure 4 so that when the tire-rims 15 are put in place (see Fig. 2) they overhang the wheel on the inboard and outboard sides.

The rims 15 have driving lugs 16 on their inner faces which engage with substantially radial faces or driving shoulders 17 on the saddle or fixed rim-seat 5.

At a plurality of points spaced around the periphery of the wheel, I provide movable rim-seats indicated generally by the numeral 18. These rim-seats include two seats 18a disposed adjacent to the fixed rim-seat 5 and also include two or more intermediate rim-seats 18b which are disposed on the periphery of the wheel between the rim-seats 18a and remote from the fixed rim-seat 5. Corresponding to each rim-seat 18a, I provide clamping-up means cooperating with the wheel body and the rim-seat to force the same outwardly, and this means is so constructed that it has an interlocking connection with the rim-seat which will hold the rim-seat on the wheel when the clamping-up means is loosened up. In order to accomplish this, I prefer to provide a rim-seat carrier 19 corresponding to the rim-seat, said rim-seat carrier being in the form of a wedge block formed with a taper and mounted on the wheel so that it can be moved longitudinally with the axis of the wheel. This movement provides the adjustment for forcing the rim-seats 18a outwardly. In order to enable the wedge blocks to accomplish this, one or more of their faces are inclined with respect to the axis of the wheel. In the present embodiment of the invention, I provide inclined faces on the radially inner sides and the radially outer sides of these blocks. This gives a very quick unlocking action for the rim-seats, that is to say, for a given movement of the block along the axis of the wheel, a relatively large radial inward movement or radial outward movement of the rim-seat will occur.

To this end each rim carrier is provided with an inclined radially inner face 20 which rests against a corresponding inclined thrust face 21 formed at the hub portion of the wheel body. At the radially outer side of the wedge block an inclined thrust face 22 is provided and this face is formed with a dovetail or T-shaped tongue 23 (see Fig. 1) that runs in a correspondingly T-shaped groove 24 on the radially inner side of the rim-seat.

Each wedge block is cut away at its large end to form a large chamber 25 into which the outer end of a stud 26 projects, the inner end of the stud being threaded and permanently secured in the wheel body. On the stud 26 I provide a nut 27 which is mounted to swivel in an opening 28 formed in the inner portion of the wedge block. In order to prevent the nut from becoming disconnected from the wedge block, its inner portion is of reduced diameter and formed with a circumferential groove 29 which receives a transverse locking pin 30 driven through the block. (See Fig. 2).

Each block 19 is received in a radial socket 31 in the wheel formed by means of deep U-shaped notches in the flanges 3 and 4. It is not necessary for the sides of the blocks to engage the side faces of the sockets 31. In fact, I prefer to leave some clearance at these points. (See Fig. 1). The axis of the stud 26 is substantially parallel with the inclined thrust face 21 so that when the nut 27 is unscrewed, the wedge block 19 will travel toward the outboard side of the wheel and approach the axis of the wheel. This movement toward the axis of the wheel through the operation of the tongue 23 and groove 24 will draw the rim-seat 18a radially inwardly.

In order to keep the rim-seat 18 in place between the flanges 3 and 4, it is provided with laterally projecting flanges 32, the side faces of which engage the inner faces of these flanges. (See Fig. 2).

If the nut 27 is tightened up as far as possible, the inner end face 33 of the wedge block 19 will seat against the inner face 34 of the flange 4. (See Fig. 2). In other words, this face 34 operates as a stop to arrest the movement of the wedge block in a position in which the seat faces 35 of the rim-seats 18 will be in circumferential alignment with the seat faces 11 of the fixed seat 5.

However, the inner end faces 36 of the wedge blocks 19b are cut away as indicated in Figure 3 so as to provide clearance at the point 37 so that when their nuts 27b are screwed up tight, the seat faces 18c of the rim-seats 18b will not come tight against the inner face of the rim. In other words, the clamping movement of the wedge blocks 19b is not limited, and after the rim is set in place, the nuts 27b will be tightened up so as to clamp the blocks 19b tight against the rim.

It will be evident that in order to remove a tire it is merely necessary to unscrew the two nuts 27b.

It will be noted that in changing the tires on a wheel embodying my invention, the nuts 27 and 27b are never removed as separate pieces. Each nut constitutes a part of the assembly of its corresponding wedge block. This is very advantageous as it avoids any possibility of the nuts becoming lost. In changing a tire it is merely necessary to loosen up these nuts to withdraw slightly the wedge block and then tighten them up again after the substitute tire rims are in place.

If it is desired to adapt this wheel to receive a tire-rim of larger diameter, it is merely necessary to provide a fixed seat 5 of a larger size in which the rim-seat 11 would be located on the arc of a greater circle. At the same time sufficient material could be removed from the faces 33 and 36 of the movable rim-seats to adapt them for cooperation with the rim of the larger.

It is understood that the embodiment of the invention described herein is only one of the many embodiments this invention may take, and I do not wish to be limited in the practice of the invention, nor in the claims, to the particular embodiment set forth.

What I claim is:

1. An automobile wheel for carrying dual tire rims having driving lugs, comprising a wheel body having a relatively deep, substantially V-shaped socket at one point in its periphery, a saddle welded in the socket and having a tire seat located at each side of the socket with faces for engaging the driving lugs of a tire rim, and movable rim seats mounted spaced around the periphery of the wheel with means for forcing the same outwardly to clamp the inner faces of a tire rim.

2. An automobile wheel comprising a metal wheel body, a saddle consisting of a part distinct from the wheel and welded to the wheel at its periphery, said saddle having a rim-seat on its radially outer side, a pair of rim-seats mounted in the periphery of the wheel, one at each side of the saddle and spaced therefrom, a wedge block corresponding to each of the last-named rim-seats, threaded studs and nuts cooperating with the wedge blocks to enable the wedge blocks to be moved laterally inward and thereby enable their corresponding rim-seats to be moved radially outward on the wheel, stop means limiting the movement of the wedge blocks to circumferentially aline their seats with the rim-seat of the saddle, another pair of movable rim-seats located between the first-named movable rim-seats and on the opposite side of the wheel from the saddle, a wedge block corresponding to each of the last-named movable rim-seats, studs and nuts cooperating with the last-named wedge blocks and enabling the same to be moved laterally inward to force the last named rim-seats radially outward to clamp the tire rim.

3. An automobile wheel comprising a metal wheel body having a socket at a point in its periphery, a saddle consisting of a part distinct from the wheel and welded in the said socket, said saddle having a rim-seat on its radially outer side, a pair of rim-seats mounted in the periphery of the wheel, one at each side of the saddle and spaced therefrom, a wedge block corresponding to each of the last-named rim-seats, threaded studs and nuts cooperating with the wedge blocks to enable the wedge blocks to be moved laterally inward and thereby enable their corresponding rim-seats to be moved radially outward on the wheel, stop means for limiting the movement of the wedge blocks to circumferentially aline their seats with the rim-seat of the saddle, another pair of movable rim-seats located between the first-named movable rim-seats and on the opposite side of the wheel from the saddle, a wedge block corresponding to each of the last-named movable rim-seats, studs and nuts cooperating with the last-named wedge blocks and enabling the same to be moved laterally inward to force the last-named rim-seats radially outward to clamp the tire rim.

4. An automobile wheel comprising a wheel body having a socket at a point in its periphery, a saddle consisting of a part distinct from the wheel, and welded in the said socket, said saddle having a rim-seat on its radially outer side and having substantially radial faces to be engaged by the driving lugs of a tire rim mounted on the rim-seat, a pair of rim-seats mounted in the periphery of the wheel, one at each side of the saddle and spaced therefrom, a wedge block corresponding to each of the last-named rim-seats, threaded studs and nuts cooperating with the wedge blocks to enable the wedge blocks to be moved laterally inward and thereby enable their corresponding rim-seats to be moved radially outward on the wheel, stop means for limiting the movement of the wedge blocks to circumferentially aline their seats with the rim seat of the saddle, another pair of movable rim-seats located between the first-named movable rim-seats and on the opposite side of the wheel from the saddle, a wedge block corresponding to each of the last-named movable rim-seats, studs and nuts cooperating with the last-named wedge blocks and enabling the same to be moved laterally inward to force the last-named rim-seats radially outward to clamp the tire rim.

5. An automobile wheel comprising a wheel body having a socket extending from the outboard side toward the inboard side of the wheel and located at a single point in its periphery, the wall of said socket being rigid with the wheel body, and a substantially V-shaped saddle consisting of a part distinct from the wheel and mounted fixedly in the said socket with the wide part of the saddle disposed radially outward, said saddle having a rim seat on its radial outer side and having driving faces adjacent the rim seat for engaging driving lugs on a tire rim when mounted on the wheel, and movable rim seats mounted spaced around the periphery of the wheel with means for forcing the same radially outwardly to clamp the radial inner face of a tire rim, said parts cooperating to enable saddles of different sizes to be used on the same wheel body to form complete wheels for carrying different size rims.

LLOYD D. KAY.